Sept. 20, 1955　　　E. JEDRZYKOWSKI　　　2,718,271
TRACTOR WHEREIN THE SPEED IS SELECTIVELY
CHANGED WHILE IN MOTION
Filed Feb. 18, 1953　　　　　　　　　　　3 Sheets-Sheet 1

Inventor:
Edmund Jedrzykowski
Paul O. Pippel
Attorney.

Sept. 20, 1955   E. JEDRZYKOWSKI   2,718,271
TRACTOR WHEREIN THE SPEED IS SELECTIVELY
CHANGED WHILE IN MOTION
Filed Feb. 18, 1953   3 Sheets-Sheet 3

Inventor:
Edmund Jedrzykowski
By: Paul O. Pippel
Attorney.

United States Patent Office 2,718,271
Patented Sept. 20, 1955

2,718,271

TRACTOR WHEREIN THE SPEED IS SELECTIVELY CHANGED WHILE IN MOTION

Edmund Jedrzykowski, Chicago, Ill., assignor to International Harvester Company, a corporation of New Jersey Application February 18, 1953, Serial No. 337,491

8 Claims. (Cl. 180—54)

This invention relates to motor vehicles and more particularly to tractors of the type generally used in conjunction with farm equipment, wherein the tractor engine is operated at a governor controlled speed. This application is a continuation-in-part of application Serial No. 196,279, filed November 17, 1950, for Tractor with Fore and Aft Transmission Units Arranged in Tandem Within the Torque Housing, and since abandoned.

A general object of the invention is to provide a simplified tractor incorporating a conventional change-speed gear set and a novel auxiliary torque amplifier, wherein the gear set and torque amplifier are arranged in an effective relationship which reduces the number of parts to the minimum.

A more specific object of the invention is to arrange the gear set and the torque amplifier in alignment with each other longitudinally of the tractor and to locate the same within the waist or the housing which normally extends between the front and rear portions of the tractor and forms a connection therebetween.

A further object of the invention is to devise a novel mechanism in a vehicle having such a speed controlled engine for selecting speed ratio, and more specifically to a novel form of transmission in which the transition interval occurs without the necessity of stopping the tractor and then changing to a lower gear as required at present, so as to utilize stored momentum in the tractor in a continuing operation.

Another object of the invention is to arrange the transmission housing to act as a reaction member for the transmission mechanism including the conventional gear set and the novel torque amplifier.

These and other objects of the invention will become more apparent from the specification and drawings wherein.

Figure 1:
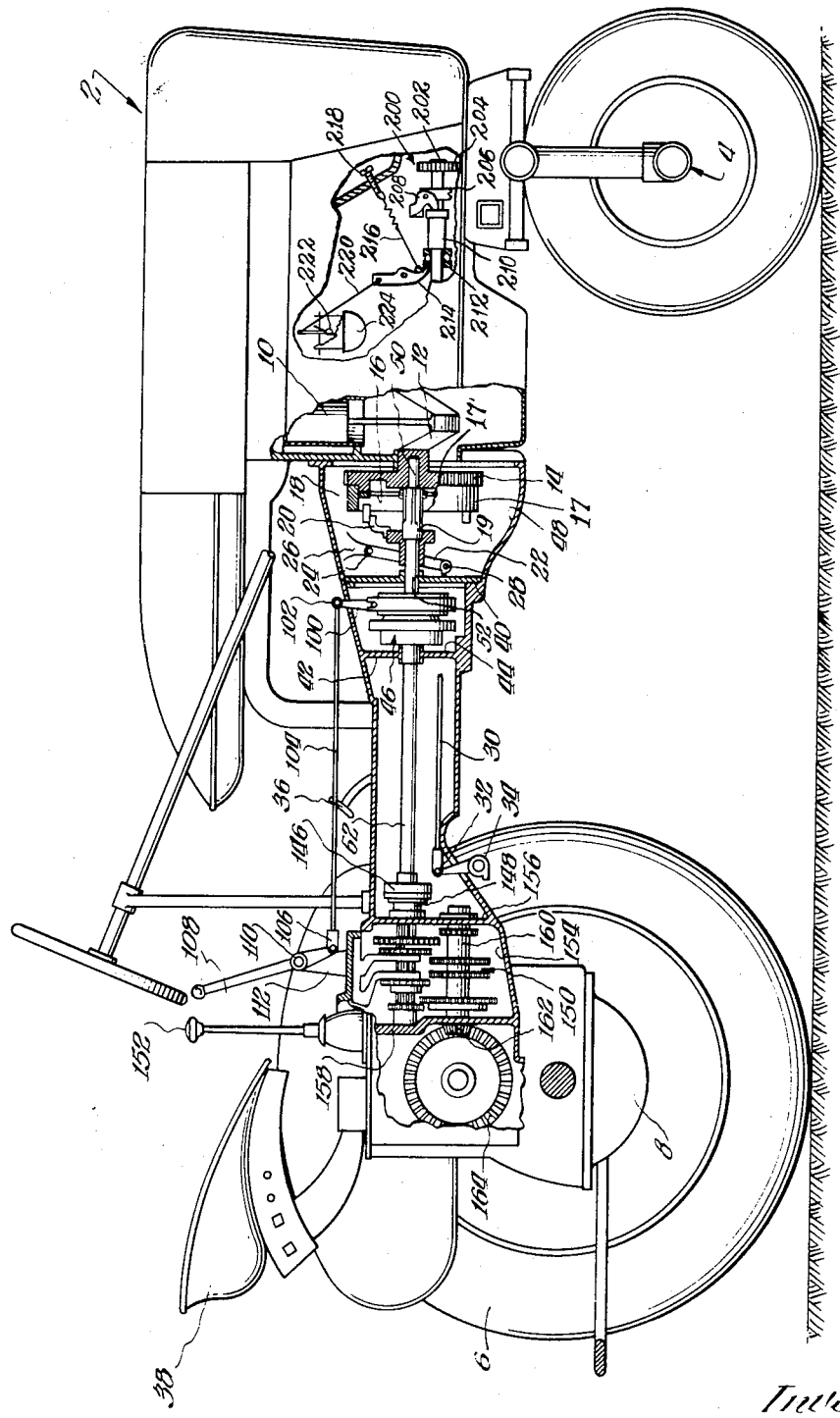
Fig. 1 is a side elevational view of a conventional tractor incorporating the invention, the transmission housing and rear end being shown in vertical section longitudinally of the tractor.

Describing the invention in detail, the tractor generally indicated 2, comprises the usual front steering truck 4 supporting the front end of the tractor, and traction driving wheels or other vehicle propelling ground-engaging members 6 supporting the rear end of the tractor through an axle housing or traction-wheel-mounted casing 8.

The tractor comprises an internal combustion engine 10 at its front end which includes the usual main or crankshaft 12 with a fly-wheel 14 at its rear extremity associated with a conventional clutch disk arrangement 16 housed within the bell-shaped clutch housing portion constituting the forward end of a generally cylindrical or tubular body portion or housing 18 connected to the engine block of the engine 10, as will be readily understood by those skilled in the art. The main clutch 16 has a driving element 17 driven from the engine and a driven part 17' which has a splined connection with a drive shaft 19 on which is slidably mounted a clutch operating mechanism 20 connected to a throw-out lever 22 which is pivoted at one end as at 24 to a lug 26 within the housing 18, the other end of lever 22 being pivoted as at 28 to one end of a rod 30 which at its other end is pivoted as at 32 to suitable linkage 34 which is operably associated with a clutch pedal 36 conveniently located for operation by an operator when seated on seat 38.

The housing 18 is compartmented adjacent to its forward end by spaced front and rear bulkheads 40 and 42, the bulkhead 42 being formed at its outer periphery integral with the interior of the housing 18. The bulkheads 40 and 42 are spaced longitudinally of the housing and define a compartment 44 therebetween for a torque amplifier or planetary type auxiliary change-speed transmission unit generally indicated 46. Forwardly of compartment 44 which is at the neck portion of the bell-shaped clutch housing portion, the bulkhead 40, which adjacent to its outer periphery is seated against a shoulder 41 within the housing and connected to the housing as by spaced bolts 43, defines a compartment 48 which receives the beforementioned flywheel 14 and clutch 16 and mechanism 20 and 22 therefor.

The drive shaft 19 has a rotatable fit as at 50 at its forward extremity with the rear end of the crankshaft 12 of the motor. It will be noted that the axes of rotation of the shafts 12 and 19 are coaxial. The rear extremity of the driving shaft 19 is journalled and extends through a bushed opening 52 in the front bulkhead or closure plate 40 of the housing 18 into the intermediate section of the housing.

The shaft 19 has adjacent to its rear end a splined connection as at 54 to rear and front or second and first integrally united sun gears or driving elements 56 and 58 which are rotatable with the shaft 19. The rear extremity of the shaft 19 extends into a bushed opening 60 within an output or driven shaft 62 which is journalled on wall 42 and extends through a bushed opening 64 in said wall 42. It will be noted that the axes of rotation of shafts 62 and 19 are coaxial.

The first or front sun gear 58 meshes with a plurality of planet or pinion gears 66 which are rotatable on axes parallel to the axis of rotation of shaft 19 on pins 68 which at one of their ends are connected to a planet carrier 70 rotatably mounted as at 72 on the shaft 19. The planet gears 66, 66 mesh with a surrounding frictionally engageable ring gear 74 or reaction member which is rotatably mounted as at 76 on the hub 78 of the carrier 70. The ring gear provides an annular friction surface 80 at its outer periphery which is engageable by a surrounding split brake band 82, the band having a metallic outer portion lined with braking material and having outturned lugs 84 and 86 at its ends sleeved over a rod 88 one end of which is slidably fitted as at 90 within a socket 92 on the housing 18. A release spring 94 is disposed between the opposite ends of the band in abutment with the adjacent sides of the lugs 84 and 86 and is adapted to spread the ends of the band to disengage it from the frictionally engageable ring gear 74. The rod or shaft 88 extends at its opposite end through an opening 96 in the housing 18 and outwardly of the housing is connected as at 98 to one end of an operating lever 100, the opposite end of which is connected as at 102 to one end of a rod 104 which at its opposite end is pivoted as at 106 to the lower end of a hand lever 108 pivoted as at 110 intermediate its ends to a bracket 112 mounted on a cover plate or the housing 18. It will be seen that the lever 108 and the above described linkage connecting it with the brake band 82 constitutes means in control of the frictionally engageable means 82, 80 for selective engagement and disengagement thereof, and that the lever 108 is located in a convenient position for manipulation by the operator. It will be understood that a conventional vacuum system or electrical control may be substituted for the hand lever 108 to operate from the manifold to control the amplifier when the speed of the engine falls off.

Figure 2:
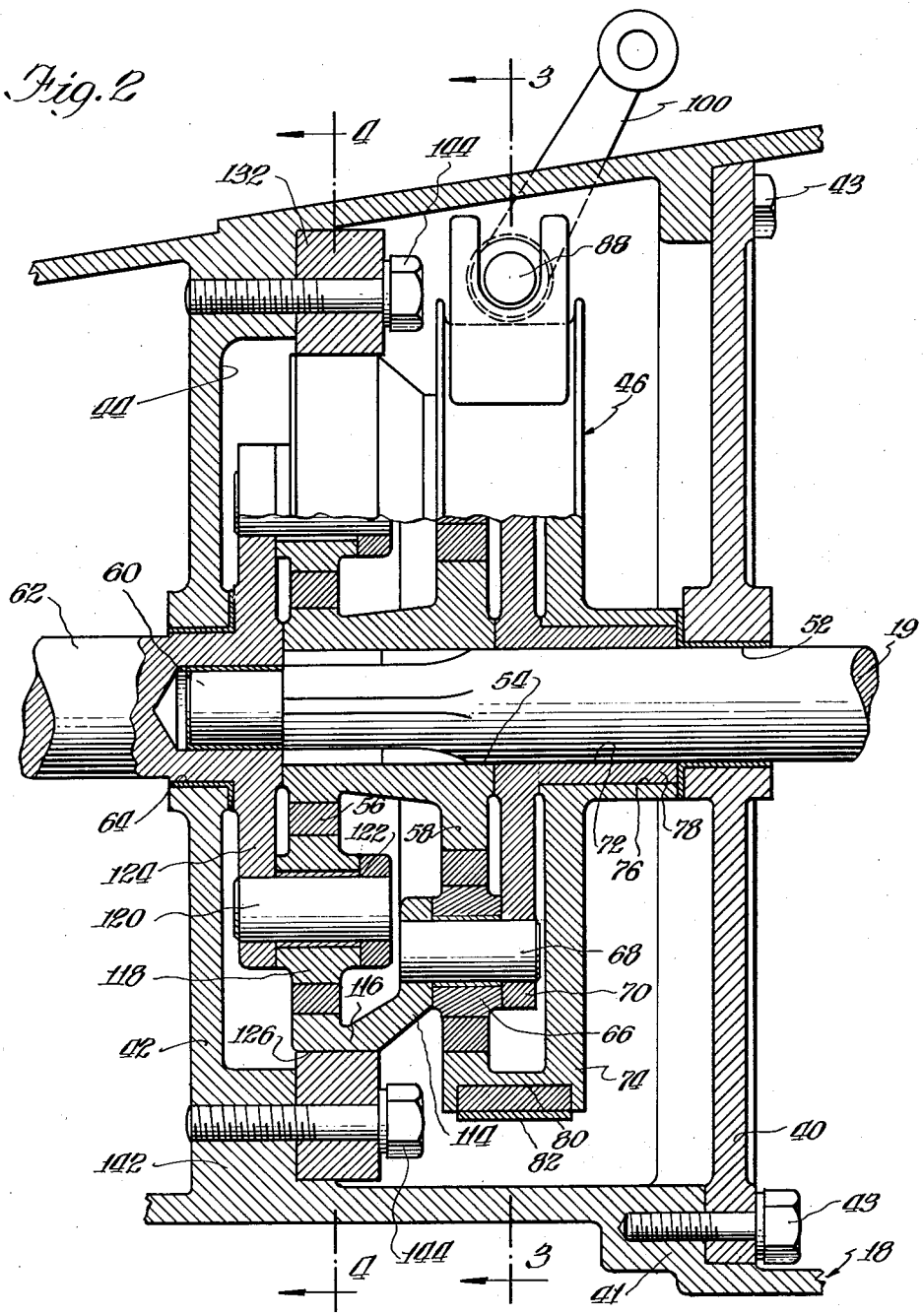
Fig. 2 is an enlarged view of the torque amplifier with portions shown in axial section.

The pins 68, 68 mounting the pinions 66, 66, as heretofore stated, are connected at one of their ends to planet carrier 70. These pins 68 are connected at their opposite ends to a ring gear or annulus 114 (Figs. 2 and 4), said annulus having at its outer periphery a drum extension or force reaction element or means 116 which is toothed on its internal edge and meshes with planet or pinion gears 118 which are rotatable on pins 120, 120 connected at one of their ends to a positioning ring 122 and at their other ends to a planet carrier or driven element 124 formed integral with the forward end of the output or delivery shaft 62.

Figure 4:
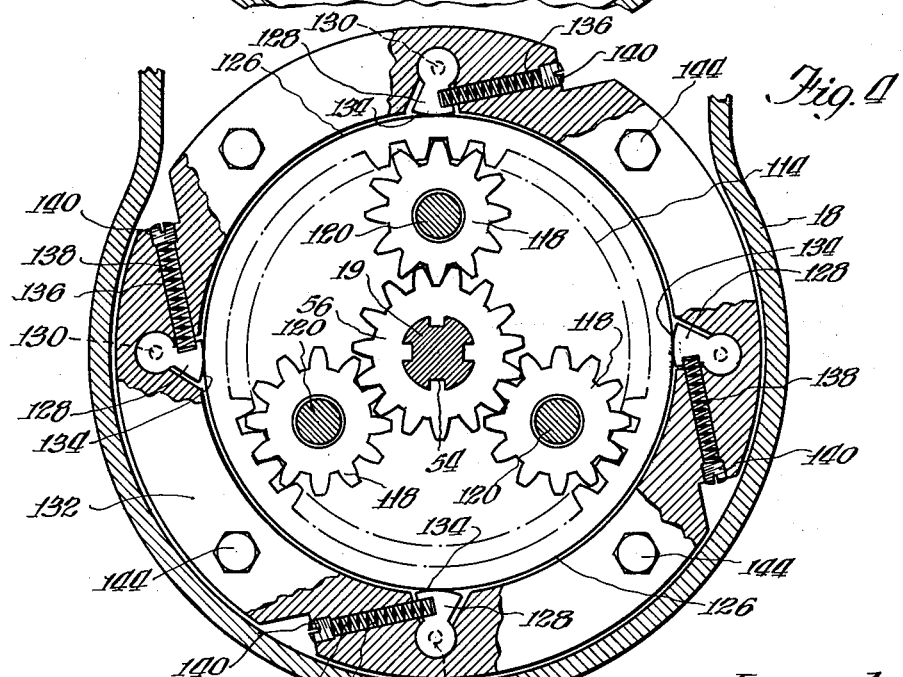
Fig. 4 is a sectional view taken on the line 4—4 of Fig. 2.

The ring gear 114 on its drum extension 116 provides an outer cylindrical surface 126 which is associated with one way gripping or brake means, each of said gripping means comprising a cam lug 128 pivoted at its outer end as at 130 to an annular support member 132 on an axis parallel to the axis of rotation of the shafts 19 and 62, and, of course, that of the ring gear 114. Each cam lug 128 has its inner cam face 134 engaged with the surface 126, the lug being biased to engaging position by a spring 136 housed within a bore 138 in the support member 132. The compression of each spring 136 is adjustable by a retaining screw 140 threaded into the outer end of each bore 134. The support ring 132 is secured to a thickened portion 142 around the outer periphery of wall 42 by means of bolts 144. As best seen in Fig. 4, the one way gripping means resists rotation of the ring gear 114 in a counterclockwise direction.

The output shaft 62 extends into the housing 18 rearwardly of wall 42, and at its rear extremity is connected preferably by means of a flexible coupling 146 to an input shaft 148 of a conventional main speed change gear unit set or system generally indicated 150 and manually operable by a shift lever 152 conveniently located adjacent to the driver's seat 38. The change-speed transmission is characterized by having power trains of different speed ratios selectively changed only while the tractor is at rest or attains a state of rest when the speed change is initiated while substantial traction load through such transmission to the traction wheels is essential to maintain vehicular travel. It will be seen that the input shaft 148 is coaxial with the shaft 62 and that the speed change gearing is located within a main change-speed containing section of the housing 18 adjacent to the rear end thereof and is disposed within the compartment 154 defined between spaced walls 156 and 158 adjacent to the rear end of housing 18, said walls 156 and 158 being formed integral with the interior of the housing 18 and providing journals for the input shaft 148 of the gearing 150 and the output or tail shaft 160 thereof. The tail shaft 160 is provided rearwardly of wall 158 with a pinion gear 162 which meshes with a ring gear 164 associated with a conventional differential gearing diagrammatically illustrated, the differential gearing being operably associated with rear wheel axles which are operably connected to the rear traction wheel 6 of the tractor in conventional manner as will be readily understood by those skilled in the art.

When the operator desires higher torque in the driving wheels, he releases the brake means from the ring gear 74 and the input shaft revolving in the clockwise direction (Fig. 3), the following action takes place: The sun gear 58 rotates with the shaft 19 in a clockwise direction. The planet gears 66, 66 rotate in a counterclockwise direction and the ring gear 74 also rotates in a counterclockwise direction. Under these conditions the path of power is not transmitted to the output shaft 62 from the sun gear 58. However, the sun gear 56 which is rotating with the shaft in a clockwise direction, as shown in Fig. 4, causes the pinions 118 to rotate in a counterclockwise direction and tends to rotate the ring gear 114 also in counterclockwise direction (Fig. 4) which is prevented by the camming action of cam lugs 134 with the surface 126. This causes the ring gear 114 to become stationary and act as a reaction member which in turn causes the planetary pinions 118 to orbit around the sun gear 56 carrying the planet carrier 124 and the integral output shaft with it. It can be readily seen that the orbit speed of the planetary pinions 118 around the sun gear 56 is appreciably slower than the speed of rotation of the sun gear 56. This furnishes the reduction of speed of the output shaft 62 from that of the input shaft 19 with the multiplication of torque in the same ratio. Mathematically, the reduction of speed can be expressed in this simple formula:

$$r' = \frac{d'}{a'} + 1$$

where $r'$ = speed ratio of input shaft 19 to output shaft 62
$d'$ = number of teeth in the ring gear 114
$a'$ = number of teeth in the sun gear 56

Should the operator desire high speed and low torque, he will actuate the lever 108 by rotating it in a clockwise direction (Fig. 1) thus moving the rod 104 to the left and rotating the lever 100 in a counterclockwise direction (Figs. 1 and 2), whereby a cam member 166 connected as by a pin 167 to the rod 88 and in diagonal cam-face engagement as at 168 with a cam member 170 connected to the housing 18 causes the rod 88 which has shouldered engagement at 172 with lug 86 to shift to the left (Fig. 3), compressing the spring 94 and effecting hoop tension on the friction member 82 to tightly engage it with the surface 80 on the ring 74. The lug 84 abuts as at 174 against a threaded sleeve 176 disposed within the opening of socket member 92, the sleeve being threaded to member 92 and locked to the housing by a locking nut 178 for adjusting the sleeve to position the band 82.

Figure 3:
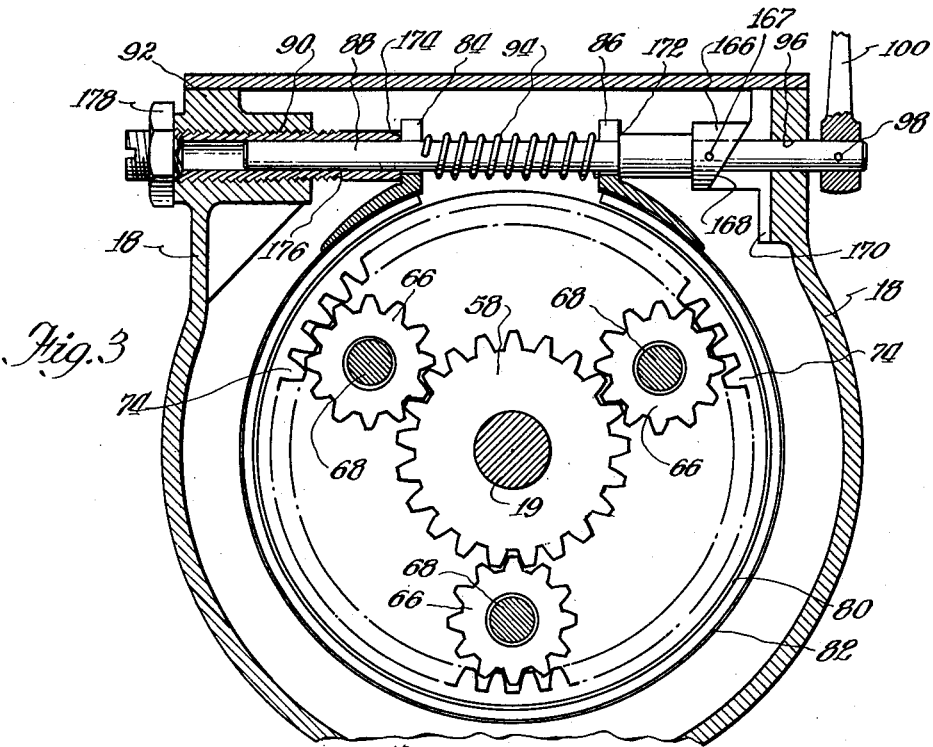
Fig. 3 is a transverse sectional view taken substantially on the line 3—3 of Fig. 2.

By stopping rotation of the ring gear 74, the ring gear 74 becomes a reaction member for the planetary pinions 66, causing them to orbit around the sun gear 58 carrying the planet carrier 70, drum extension 116 and the ring gear 114 with it in the clockwise direction (Fig. 3). The clockwise rotation of the ring gear 114 tends to rotate the planetary pinions 118 in the clockwise direction, at the same time the clockwise rotation of the sun gear 56 rotates the planetary pinions 118 in the counterclockwise direction (Fig. 4). The combined action of the ring gear 114 and the sun gear 56 on the planetary pinions causes them to orbit around sun gear 56 in the clockwise direction at a faster rate than if the ring gear 114 were stationary. The planet carrier 124 and the integral output shaft 62 are also rotated in the clockwise direction by the orbit action of the planetary pinions 118 but at a reduced speed from that of the input shaft 19.

The reduction of speed between the input shaft 19 and output shaft 62 in the low torque but high speed position of the torque amplifier can be expressed mathematically by the formula:

$$r = \frac{(d+a)(d'+a')}{a'(d+a) + ad'}$$

where $r$ = speed ratio of input shaft 19 to output shaft 62
$d$ = number of teeth in ring gear 74
$a$ = number of teeth in sun gear 58
$d'$ = number of teeth in ring gear 114
$a'$ = number of teeth in sun gear 56

The overall torque amplification of the torque amplifier is equal to ratio of high torque speed reduction to low torque speed reduction or $$\text{Torque amplification} = \frac{r'}{r}$$

The power output in shaft 62 is conveyed to the change-speed gearing 150 which in turn is conveyed to the differential and thence to the drive wheels 6.

It will be readily apparent that the gear ratio of the normal complement of the set 150 is thus modified by the auxiliary unit 46 without disengaging the engine from the drive wheels 6.

The engine is of the constant speed type for efficient operation and the selected speed is maintained while the engine is subjected to variable load by a governor means generally designated 200 mounted upon the engine block and comprising a fore and aft shaft 202 journalled in suitable housing structure connected to the block, the shaft 202 being keyed to a gear 204 which is engine driven as a function of crankshaft speed such as through a counter-camshaft. The shaft 202 has a collar 206 sleeved and fixed thereon, the collar pivotally supporting on axes transverse to shaft 202 a circumferentially balanced series of governor bellcrank levers 208 pivoted intermediate their ends at their elbows and having centrifugally operable portions at their outer ends and heel portions at their inner ends. The heel portions abut one end of a movement transmitting sleeve 210 mounted on shaft 202 for endwise movement thereon and at the other end abutting one side of a thrust bearing 212 sleeved about shaft 202, the bearing 212 abutting one end of a lever 214 pivoted intermediate its ends to the housing. The lever adjacent to the end at bearing 212 is connected to one end of a control spring 216 which at its opposite end is connected to a set screw 218 which may be threaded in the housing. It will be understood that in lieu of the screw 218, suitable linkage extending to the operator's station may be provided. The spring is orientated to constantly bias the thrust bearing and the sleeve in a direction collapsing the governor weights toward the shaft 202. The other or outer end of lever 214 is pivoted to one end of throttle rod 220 which at its other end is pivoted to a lever arm of a butterfly throttle valve 222 of the engine carburetor or fuel metering device 224 mounted upon the intake manifold of the cylinder block. The butterfly valve element, when the engine is stopped, is disposed in the horn in fully open position.

It will be understood that as the engine speeds up after starting the weights will be thrown outward rotating the governor levers 208 in directions urging the heel portions thereof against the sleeve 210 in opposition to spring 216 and rotating lever 214 in a direction actuating the linkage 220 into closing position of the valve 222 to the value determined by the setting of spring 216.

It will also be noted that the positioning of the two transmission units in tandem in the arrangement shown provides a simplified assembly with a minimum of parts and utilizes the housing 18 as a reaction member at areas of mechanical advantage, namely, adjacent the ends thereof where it is connected to adjacent structure. The housing 18 is narrowed at its center and flared at its ends to provide a compact, strong construction with internal braces in the form of bulkheads.

It will be noted that the tractor when initially started for operation will be set at the main change-speed transmission in the most favorable gear setting and that the brake will be applied to the orbit gear 74 so that the power is transmitted at higher speed and lower torque through the converter 46 as heretofore described. When the tractor engine is posed with an overload condition and the tractor begins to slow down even though engine torque at speed is being automatically maintained the operator shifts the lever 108 to disengage the brake 82 from element 74 whereupon the orbit gear 116 is reversed in direction of rotation and held by the one-way brake and the power is transmitted from the gear 56, through pinions 118 to carrier 124 to shaft 62 at higher torque but slower speed without interrupting vehicular motion of the tractor.

I claim:

1. In a tractor, an engine including a fuel metering device; a traction-wheel-mounted casing; a tubular body portion extending lengthwise of the tractor in interconnecting relation with the engine and the casing; means operable of said metering device for maintaining the engine at substantially constant speed while subjected to variable load; said body having a main clutch housing portion constituting a forward part thereof adjacent the engine, a main change-speed transmission gearing-containing section adjacent the rear end thereof and an intermediate section between the clutch housing portion and the main change-speed transmission-containing section; a main clutch in said clutch housing portion of the body and comprising a driven part and a driving element driven from the engine; a main change-speed transmission gearing unit within said rear section of the body and characterized by having power trains of different speed ratios selectively changeable only while the tractor is at rest, said transmission unit having a tail shaft through which power is transmittable to the traction wheels; and an auxiliary change-speed transmission unit of the planetary gear species disposed within the intermediate section of the body, said auxiliary unit including a driving element in driven relation with the driven part of the main clutch, a driven element in driving relation with the main change-speed transmission gearing, and a force-reaction element reactable against the tractor body to mobilize said auxiliary transmission unit for transmitting power from the clutch to the main transmission at one speed transmitting ratio; frictionally engageable means selectively operable for connecting another of the auxiliary transmission unit elements in driven relation with said driven part of the clutch so as to be driven thereby to mobilize said unit for transmitting power from the clutch to the main change-speed transmission at a higher speed transmitting ratio, and means including gearing of the auxiliary transmission unit that is operable pursuant to the disconnection of such other auxiliary transmission unit element and the attendant predetermined deceleration of the tail shaft to beget reaction of the force-reaction element against the body while the speed of the engine remains substantially constant.

2. In a tractor having rear traction wheels and front steering wheel means, an engine including a fuel metering device; a transverse traction-wheel-mounted casing; a tubular body portion extending lengthwise of the tractor in interconnecting relation with the engine and the casing; means operable of said metering device for maintaining the engine at substantially constant speed while subjected to variable load; said body having a main clutch housing portion constituting a forward part thereof adjacent the engine, a main change-speed transmission gearing-containing section adjacent the rear end thereof and an intermediate section between the clutch housing portion and the main change-speed transmission-containing section; a main clutch in said clutch housing portion of the body and comprising a driven part and a driving element driven from the engine; a main change-speed transmission gearing unit within said rear section of the body and having a tail shaft through which power is transmittable to the traction wheels, said main change-speed transmission characterized by power trains of different speed ratios changeable only while the tractor is at rest; and an auxiliary change-speed transmission unit of the planetary gear species disposed within the intermediate section of the body, said auxiliary unit including a driving element in driven relation with the driven part of the main clutch, a driven element in driving relation with the main change-speed transmission gearing, and a force-reaction element reactable against the tractor body portion to mobilize said auxiliary transmission unit for transmitting power from the clutch to the main transmission at one speed transmitting ratio, frictionally engageable means selectively operable for connecting another of the auxiliary transmission unit elements in driven relation with said driven part of the clutch so as to be driven thereby to mobilize said unit for transmitting power from the clutch to the main change-speed transmission at a higher speed transmitting ratio, and means including gearing of the auxiliary transmission unit that is operable pursuant to the disconnection of such other auxiliary transmission unit element and the attendant predetermined deceleration of the tail shaft to beget reaction of the force-reaction element against the body while the speed of the engine remains substantially constant, said force-reaction element having a force output oriented circumferentially of said body portion.

3. In a tractor, an engine including a fuel metering device; governor means operable of said metering device for maintaining the engine at substantially constant speed while subjected to variable load; a traction-wheel-mounted casing; a tubular body portion extending lengthwise of the tractor in interconnecting relation with the engine and the casing, said body having a clutch housing portion constituting a forward part thereof adjacent the engine, a main change-speed transmission gearing-containing section adjacent the rear end thereof, and an intermediate section between the clutch housing portion and the main change-speed transmission gearing containing section; a main clutch in said clutch housing portion of the body and comprising a driven part and a driving element driven from the engine; a main change-speed transmission gearing within said rear section of the body and characterized by having power trains at different speed ratios selectively changeable only after the tractor has come to rest when the change is initiated while substantial traction load through such transmission is essential to maintain vehicular travel, said main transmission having a tail shaft through which power is transmittable to the traction wheels; and a planetary gear type auxiliary change-speed transmission unit disposed within the intermediate section of the body, said auxiliary unit including a one-way brake mounted upon said intermediate section, a driving element in driven relation with the driven part of the main clutch, a driven element in driving relation with the main change-speed transmission gearing, and a force-reaction element cooperative with the one-way brake for reaction thereagainst to mobilize said auxiliary transmission for transmitting power from the clutch to the main transmission at one speed transmitting ratio, frictionally engageable means selectively operable for connecting another of the auxiliary transmission elements in driven relation with said driven part of the clutch so as to be driven thereby to mobilize said unit for transmitting power from the clutch to the main change-speed transmission at a higher speed transmitting ratio attendant to disconnection of said reaction element from said one-way brake and means including gearing of the auxiliary transmission unit that is operable pursuant to the release of said frictionally engageable means and attendant disconnection of such other auxiliary unit element and predetermined deceleration of the tail shaft to beget co-operation between said force reaction element and said one-way brake attendant to maintenance of the same governor speed.

4. In a tractor, a mobile structure including ground-engaging propelling means; an engine carried upon the structure and including a fuel metering device; means operable of said metering device for maintaining the engine at substantially constant speed while subjected to variable load; a driven shaft operatively connected to the engine, a main change-speed transmission gearing unit carried on the mobile structure and characterized by having power trains of different speed ratios selectively changeable only while the tractor is at rest, said main transmission unit having a tail shaft through which power is transmittable to said propelling means and operatively connected thereto; and an auxiliary change-speed transmission unit of planetary gear species including a driving means in driven relation to said driven shaft, driven means in driving relation with the main transmission gearing, a force-reaction means operatively associated with said driven means and reactable against the frame to mobilize said auxiliary transmission unit for transmitting power from said driven shaft to said main-change-speed transmission at one speed transmitting ratio, means including elements selectively frictionally engageable to effect transmission of force from said driving means to the force-reaction means to drive the same and thus mobilize said unit for transmitting power from the driven shaft to the main change-speed transmission at a higher speed transmitting ratio, and means including gearing of the auxiliary transmission unit that is operable pursuant to disengagement of said frictionally engageable means and the attendant predetermined deceleration of the tail shaft and at substantially constant speed of the engine to beget reaction of said force-reaction element against said body to effect transmission of power at said one speed.

5. In a tractor having a wheel-supported frame, a substantially constant speed variable load engine carried thereby and including a driven shaft, a main change-speed transmission gearing unit characterized by having power trains of different speed ratios selectively changeable only after the tractor has come to rest when the change is initiated while substantial traction load through such transmission is essential to maintain vehicular travel, said main transmission unit having a tail shaft through which power is transmittable to the wheels; and an auxiliary change-speed transmission unit of planetary gear species including driving means in driven relation to said driven shaft, driven means in driving relation with the main transmssion gearing, frictionally engageable means selectively operable for connecting said first and second mentioned means to mobilize said auxiliary unit for transmitting power from the driven shaft to the main change-speed transmission at a relatively high speed and low torque, another means operably associated with said first and second mentioned means for transmitting power from the driven shaft to the main change speed transmission gearing at a relatively low speed and high torque and automatically mobilizable only upon disconnection of said frictionally engageable means, and means in control of said frictionally engageable means for selective engagement and disengagement thereof.

6. In a tractor; a variable load constant speed engine including a driven shaft, a frame with supporting wheels, and means disposed for transmitting power between said engine driven shaft and the wheels and including a main change-speed transmission gearing unit characterized by having power trains of different speed ratios selectively changeable only while the tractor is at rest and an auxiliary planetary change speed transmission interposed in driving relation between the engine shaft and the main transmission and alternately mobilizable at will to provide a high speed low torque output or a low speed high torque output to the main transmission, and means in control of the auxiliary transmission and operable at will to mobilize the same for low speed high torque output when the tractive load from the wheels through the selected speed of the main transmission and the high speed low torque output of the auxiliary transmission is of critical magnitude exceeding the power of the engine to maintain constant speed, and subsequently operable at will to mobilize the auxiliary transmission for high speed low torque output while the constant engine speed substantially prevails attendant to diminution of the tractive load to less than said critical magnitude.

7. In a tractor, a frame, a tractor-propelling constant speed type motor carried by said frame, a tractor ground-engaging member to which power is transmitted from such motor to propel said tractor, and means for transmitting power between said motor and said ground-engaging member including a main change-speed transmission unit having power trains of different speed ratios changeable only while the tractor is at rest, a second change-speed transmission unit operatively connected to said main transmission unit, and means associated with the second transmission unit for selectively controlling the operation of said second change-speed transmission unit to provide high speed low torque output and alternatively a low speed high torque output to be transmitted to said ground-engaging member while the tractor is in motion and the engine speed remains substantially constant.

8. In a tractor, a supported constant speed type motor for propelling said tractor, a tractor ground-engaging member through which power is transmitted to propel said tractor, and power-transmitting means operatively connecting said motor and said tractor ground-engaging member including a main change-speed transmission unit having power trains of different speed ratios selectively changeable to meet different load requirements only after the tractor has come to rest should the change be initiated while substantial traction load through such transmission is essential to maintain vehicular travel, an auxiliary planetary change-speed transmission unit operatively connected to said main change-speed transmission unit in all of the selective speed ratio power trains of the latter, and means associated with the auxiliary transmission unit for selectively controlling said auxiliary planetary change-speed transmission unit while the tractor is in motion and the engine speed remains substantially constant to provide an initial low speed high torque output for any selected speed train of said main transmission unit and to provide a high speed low torque output for any selected speed train of said main speed transmission unit.

References Cited in the file of this patent

UNITED STATES PATENTS

| | | |
|---|---|---|
| 1,428,221 | De Martino | Sept. 5, 1922 |
| 2,066,873 | Barnes | Jan. 5, 1937 |
| 2,072,380 | Pfeiffer et al. | Mar. 2, 1937 |
| 2,094,131 | McLean | Sept. 28, 1937 |
| 2,254,358 | Frudden et al. | Sept. 2, 1941 |
| 2,292,776 | Sinclair | Aug. 11, 1942 |
| 2,348,763 | Syrovy et al. | May 16, 1944 |
| 2,555,702 | Railton | June 5, 1951 |

FOREIGN PATENTS

| | | |
|---|---|---|
| 351,612 | Great Britain | July 2, 1931 |